US008280963B2

(12) United States Patent
Roic et al.

(10) Patent No.: US 8,280,963 B2
(45) Date of Patent: Oct. 2, 2012

(54) CACHING AND EXPOSING PRE-SEND DATA RELATING TO THE SENDER OR RECIPIENT OF AN ELECTRONIC MAIL MESSAGE

(75) Inventors: Alessio Roic, Seattle, WA (US); Del Kirk Engen, Seattle, WA (US); Fumiaki Yagi, Bellevue, WA (US); Graham D. Gibbons, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 588 days.

(21) Appl. No.: 12/101,130

(22) Filed: Apr. 10, 2008

(65) Prior Publication Data

US 2009/0259723 A1    Oct. 15, 2009

(51) Int. Cl.
*G06F 15/16* (2006.01)
(52) U.S. Cl. ...................................... 709/206
(58) Field of Classification Search ............. 709/206, 709/207
See application file for complete search history.

(56) References Cited

U.S. PATENT DOCUMENTS

| | | | |
|---|---|---|---|
| 6,108,688 A * | 8/2000 | Nielsen .................. 709/206 |
| 6,212,553 B1 * | 4/2001 | Lee et al. ................ 709/206 |
| 6,430,604 B1 | 8/2002 | Ogle et al. |
| 6,434,601 B1 * | 8/2002 | Rollins .................. 709/206 |
| 6,501,834 B1 * | 12/2002 | Milewski et al. ......... 379/93.24 |
| 6,539,385 B1 * | 3/2003 | Pollack et al. .............. 1/1 |
| 6,671,718 B1 | 12/2003 | Meister et al. |
| 6,684,238 B1 * | 1/2004 | Dutta .................... 709/206 |
| 6,839,737 B1 * | 1/2005 | Friskel .................. 709/206 |
| 6,895,426 B1 | 5/2005 | Cortright et al. |
| 6,993,563 B2 | 1/2006 | Lytle et al. |
| 7,305,441 B2 * | 12/2007 | Mathewson et al. ........ 709/206 |
| 7,395,329 B1 * | 7/2008 | Holt et al. ............... 709/224 |
| 7,444,381 B2 * | 10/2008 | Malik ................... 709/206 |
| 7,567,553 B2 * | 7/2009 | Morris .................. 370/352 |
| 7,593,984 B2 * | 9/2009 | Morris .................. 709/203 |

(Continued)

FOREIGN PATENT DOCUMENTS

JP    2007-188240 A    7/2007

(Continued)

OTHER PUBLICATIONS

"HOWTO: EWS: Get SMTP Address from X500 Address",retrieved at <<http://blogs.msdn.com/vikas/archive/2007/09/05/howto-ews-get-smtp-address-from-x500-address.aspx>>, pp. 4.

(Continued)

*Primary Examiner* — Wing Chan
*Assistant Examiner* — Alicia Baturay
(74) *Attorney, Agent, or Firm* — Hope Baldauff Hartman, LLC

(57) ABSTRACT

Technologies are described herein for caching and exposing pre-send data relating to the sender or recipient of an e-mail message. A mail client program is configured to cache recipient and configuration mail tips at a client computer. The configuration mail tips may be retrieved from a server computer and cached when the mail client program is started. Recipient mail tips may be retrieved and cached as each recipient of an e-mail message is identified. When subsequent e-mail messages are created, cached mail tips for an e-mail recipient are utilized instead of retrieving the mail tips from the server computer. The cached mail tips may be updated after a predefined period of time has elapsed. The cached mail tips may also be utilized when the client program is offline or unable to establish a connection to the server computer.

12 Claims, 9 Drawing Sheets

U.S. PATENT DOCUMENTS

| | | | |
|---|---|---|---|
| 7,634,528 B2 * | 12/2009 | Horvitz et al. | 709/200 |
| 2002/0032602 A1 | 3/2002 | Lanzillo et al. | |
| 2003/0120733 A1 * | 6/2003 | Forman | 709/206 |
| 2003/0177189 A1 * | 9/2003 | Tomono | 709/206 |
| 2003/0187939 A1 * | 10/2003 | O'Brien | 709/206 |
| 2003/0200265 A1 | 10/2003 | Henry | |
| 2004/0103162 A1 | 5/2004 | Meister et al. | |
| 2005/0010644 A1 | 1/2005 | Brown et al. | |
| 2005/0044158 A1 * | 2/2005 | Malik | 709/206 |
| 2005/0108336 A1 * | 5/2005 | Naick et al. | 709/206 |
| 2005/0278430 A1 | 12/2005 | Cato | |
| 2006/0010208 A1 * | 1/2006 | Fujisawa et al. | 709/206 |
| 2006/0036712 A1 | 2/2006 | Morris | |
| 2006/0059544 A1 | 3/2006 | Guthrie et al. | |
| 2006/0168062 A1 | 7/2006 | Herbert et al. | |
| 2006/0294188 A1 | 12/2006 | Daniels et al. | |
| 2007/0005708 A1 | 1/2007 | Juliano | |
| 2007/0043866 A1 | 2/2007 | Garbow et al. | |
| 2007/0055735 A1 | 3/2007 | Raghunandan | |
| 2007/0088788 A1 | 4/2007 | Goldberg et al. | |
| 2007/0130323 A1 | 6/2007 | Landsman et al. | |
| 2007/0192418 A1 | 8/2007 | Adams et al. | |
| 2007/0294428 A1 | 12/2007 | Guy et al. | |
| 2008/0034043 A1 * | 2/2008 | Gandhi et al. | 709/206 |
| 2008/0104175 A1 | 5/2008 | Keohane et al. | |
| 2008/0104177 A1 | 5/2008 | Keohane et al. | |
| 2008/0147818 A1 | 6/2008 | Sabo | |
| 2008/0148154 A1 * | 6/2008 | Burrell et al. | 715/733 |
| 2008/0208988 A1 * | 8/2008 | Khouri et al. | 709/206 |
| 2009/0007143 A1 * | 1/2009 | Chang et al. | 719/318 |
| 2009/0019367 A1 * | 1/2009 | Cavagnari et al. | 715/716 |
| 2009/0113001 A1 * | 4/2009 | Manning et al. | 709/206 |

FOREIGN PATENT DOCUMENTS

| | | |
|---|---|---|
| KR | 10-2006-0088280 | 8/2006 |
| KR | 10-2007-0012149 | 1/2007 |
| WO | WO2007064418 A1 | 6/2007 |

OTHER PUBLICATIONS

"Atomic E-Mail Verifier 4.11", retrieved at <<http://www.freedownloadmanager.org/downloads/verify_mail_software/>>, pp. 4.

"Verify Addresses", 1995-2007, AY Software Corporation, pp. 3.

Adams, "A More Sensitive Mail Notifier", Apr. 13, 2001, O'Reilly Media, Inc., pp. 5.

U.S. Appl. No. 11/927,592, filed Oct. 29, 2007 Inventor(s) Manning et al., entitled "Pre-Send Evaluaton of E-Mail Communications ".

International Search Report dated Oct. 22, 2009 in International Application No. PCT/US2009/036518.

U.S. Official Action dated Sep. 1, 2009 in U.S. Appl. No. 11/927,592.

U.S. Official Action dated Mar. 18, 2010 in U.S. Appl. No. 11/927,592.

Chinese Office Action dated Jul. 4, 2001 in Chinese Patent Application No. 200980112905.5.

Mexican Official Action dated Oct. 20, 2011 in Mexican Application No. MX/a/2010/010784.

"HOWTO: EWS: Get SMTP Address from X500 Address", downloaded Dec. 28, 2007 from http://blogs,msdn.comlvikas/archive/2007/09/05/howto-cws-get-smtp-address-from-x500-address.aspx, 4 pages.

"Atomic E-Mail Verifier 4.11", downloaded Dec. 28, 2007 from http://www.freedownloadmanager.org/downloads/verifLmaiLsoftware/, 4 pages.

"Verify Addresses", 1995-2007, AY Software Corporation, downloaded Dec. 28, 2007 from http://www.aysoft.com/aymail/howto/verify.htm, 3 pages.

Chinese Official Action dated May 15, 2012 in Chinese Application No. 200980112905.5.

* cited by examiner

CACHING AND EXPOSING PRE-SEND DATA RELATING TO THE SENDER OR RECIPIENT OF AN ELECTRONIC MAIL MESSAGE

BACKGROUND

Due to the asynchronous nature of electronic mail ("e-mail") systems, it is possible for e-mail messages to not be successfully delivered to their intended recipients. In this regard, the delivery of e-mail messages may fail for a variety of reasons. For instance, an e-mail message may be sent that is too large for the sender's or recipient's mailbox, the recipient's mailbox may be full, or too many recipients may be addressed on the e-mail message thereby prohibiting its transmission. In addition, e-mail senders often make embarrassing and potentially costly mistakes when composing e-mail messages. For example, a private e-mail message may be accidentally sent to a large audience or an e-mail message containing confidential material may be inadvertently sent to recipients outside of an organization. In both of these scenarios it is only after sending the e-mail message that the sender is able to discover the error.

It is with respect to these considerations and others that the disclosure made herein is presented.

SUMMARY

Technologies are described herein for caching and exposing pre-send data relating to the sender or recipient of an e-mail message. In particular, through the use of the technologies presented herein, data that may alert an e-mail sender to potential risks associated with sending an e-mail message or conditions that may cause delivery of the e-mail message to fail is retrieved, cached, and exposed to the e-mail sender during the composition of an e-mail message. Through the use of such information, the e-mail sender may choose to remove recipients from the e-mail message or choose not to send the message.

According to one aspect presented herein, a mail client program is provided that is configured to retrieve, cache, and expose e-mail tips (referred to herein as "mail tips") to an e-mail sender during the composition of an e-mail message. Mail tips are properties that relate to a sender or a recipient of an e-mail message and that are exposed to the e-mail sender prior to sending the e-mail message. One category of mail tips, referred to herein as recipient mail tips, relate to a recipient of an e-mail message. For instance, recipient mail tips may indicate when a recipient's mailbox is full, the maximum message size a recipient can receive, or that the recipient is currently out of office ("OOF"). Another category of mail tips, called configuration mail tips, relate to a sender of an e-mail message. Configuration mail tips may indicate, for example, that an e-mail message is too large to be sent by the e-mail sender or that an e-mail message being composed will cause the e-mail sender's mailbox to exceed its send limit.

According to other aspects, the mail client program is configured to cache the recipient and configuration mail tips at a client computer. In particular, in one embodiment configuration mail tips are retrieved from a server computer and stored at the client computer when the mail client program is started. The recipient mail tips are retrieved from the server computer and cached at the client computer as each recipient of an e-mail message is identified. For instance, the recipient mail tips for an e-mail recipient may be retrieved from the server computer, cached, and displayed to the e-mail sender at the time the e-mail sender provides the name of the e-mail recipient. When subsequent e-mail messages are created, mail tips that have been cached at the client computer for an e-mail recipient are utilized in lieu of retrieving the mail tips from the server computer.

According to other aspects, the cached mail tips may be periodically updated. For instance, updated configuration mail tips may be retrieved and cached after a predefined period of time (e.g. 24 hours) has elapsed since the configuration mail tips were last retrieved. The cache of certain recipient mail tips likely to change frequently may be also be updated after a predefined period of time elapses. The cache of configuration mail tips and recipient mail tips may also be utilized when the client program is offline or unable to establish a connection to the server computer.

According to other aspects, a user interface is provided for exposing the mail tips to an e-mail sender. It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
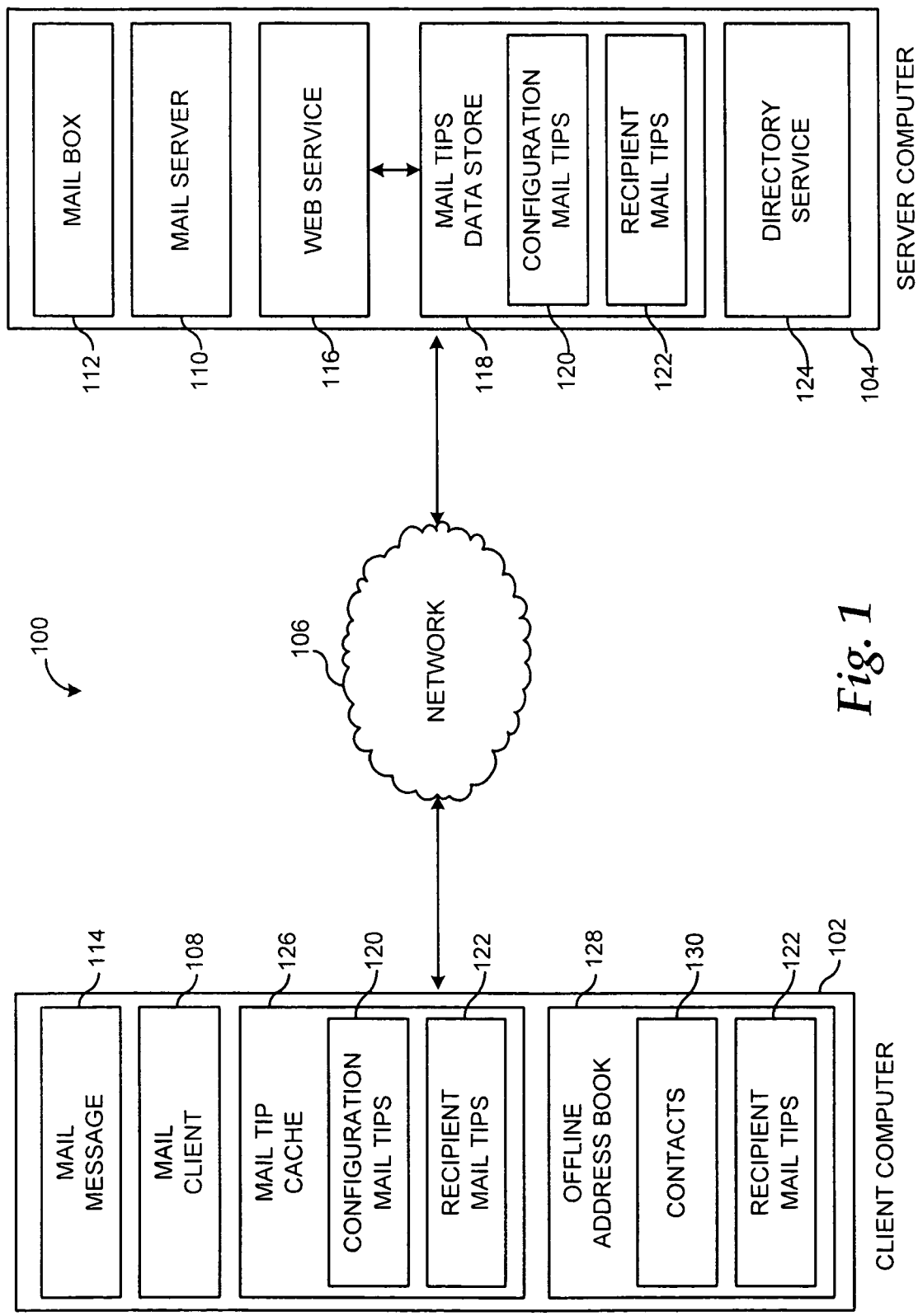
FIG. 1 is a network and software architecture diagram showing aspects of an illustrative operating environment and several software components provided by the embodiments presented herein.

Technologies are presented herein for caching and exposing pre-send data relating to the sender or recipient of an e-mail message. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for caching and exposing pre-send data relating to the sender or recipient of an e-mail message will be described.

Turning now to FIG. 1, details will be provided regarding an illustrative operating environment and several software components provided by the embodiments presented herein. In particular, FIG. 1 shows aspects of a system 100 capable of caching and exposing pre-send data relating to the sender or recipient of an e-mail message 114. The system 100 includes a client computer 102 and a server computer 104. As illustrated in FIG. 1, the client computer 102 and the sever computer 104 are interconnected through one or more local or wide area networks, such as the network 106. It should be appreciated that many more network connections may be utilized than illustrated in FIG. 1. It should also be appreciated that although only a single client computer 102 and a single server computer 104 have been illustrated in FIG. 1, many more such computing systems may be utilized in embodiments.

As shown in FIG. 1, the client computer 102 is configured to execute a mail client 108. As known in the art, the mail client 108 is a computer program configured to allow a user of the client computer 102, referred to herein as a sender, to create and transmit a mail message 114. In order for the mail client 108 to transmit the mail message 114, it must operate in conjunction with mail server program 110 executing on a server computer 104.

The mail server program 110 ("mail server") is configured to receive the request to transmit the mail message 114 from the mail client 108 and to relay the mail message 114 through appropriate server computers for delivery to its intended recipient. The mail client 108 is also configured to operate in conjunction with the mail server 110 to receive mail messages on behalf of a user of the client computer 102. In this regard, the mail server 110 may maintain a mailbox 112 for storing incoming and outgoing messages for the user of the client computer 102. It should be appreciated that the mail client 108 and the mail server 110 may provide a great deal of additional functionality with regard to the sending and receiving of mail messages other than the functionality presented herein. One example of the mail client 108 is the OUTLOOK mail client from MICROSOFT CORPORATION of Redmond, Wash. One example of a mail server 110 is the EXCHANGE mail server, also from MICROSOFT CORPORATION. It should be appreciated, however, that the embodiments presented herein may be utilized with mail clients and servers from other venders.

As described briefly above, the mail client 108 provided herein is also configured to retrieve, cache, and expose one or more mail tips to an e-mail sender during the composition of an e-mail message. Mail tips are properties that relate to a sender or recipient of an e-mail message and that are exposed to the e-mail sender prior to sending the e-mail message. By exposing the mail tips to the sender of the e-mail message prior to the sending of the e-mail, the user is made aware of the implications of sending the message prior to its actual transmission. In this way, a user can make informed decisions and potentially modify the recipients of the e-mail message or choose not to send the message altogether.

One category of mail tips, referred to herein as recipient mail tips, relate to a recipient of an e-mail message. For instance, recipient mail tips may indicate when a recipient's mailbox is full, when a user has insufficient rights to send e-mail to a restricted distribution list or mailbox, when the size of the outgoing message is higher than the maximum message size the recipient can receive, or when an e-mail address domain that cannot be validated is entered. Other examples of recipient mail tips include mail tips indicating when a recipient e-mail address is not part of the sender's organization, when a distribution list contains one or more e-mail addresses that are not part of the organization, when the number of members of a distribution list is higher than a predetermined value, when a distribution list has a moderator who reviews and filters messages before relaying them to the members of the distribution list, when a recipient has indicated that they are out of the office, when a distribution list or a mailbox has a user defined custom message, when an internal e-mail address cannot be validated, or when a large message is attempted to be sent to a large number of recipients.

Another category of mail tips referred to herein as configuration mail tips, are mail tips that relate to a sender of the e-mail message. Configuration tips may indicate, for example, that an e-mail message is too large to be sent by the e-mail sender or that an e-mail message being composed will cause the e-mail sender's mailbox to exceed its send limit. It should be appreciated that the recipient mail tips and configuration mail tips identified above are merely illustrative, and that any other information relating to a sender or recipient of an e-mail message may be presented to a user in the form of a mail tip as described herein.

In order to present the mail tips to a user of the client computer 102 prior to or during the composition of a mail message 114, the mail client 108 is configured to operate in conjunction with a web service 116 executing on the server computer 104. The web service 116 receives and responds to calls from the mail client 108 for mail tips associated with a sender or recipient of an e-mail message 114. In particular, the web service 116 maintains a mail tips data store 118. Configuration mail tips 120 are stored in the data store 118 that correspond to e-mail senders. Recipient mail tips 122 are also stored in the data store 118 that correspond to various recipients.

In one embodiment presented herein, the mail client 108 is operative to receive the configuration mail tips 120 and the recipient mail tips 122 from the web service 116 and to cache the mail tips at the client computer 102. By caching the mail tips, the mail client 108 is able to reduce the amount of traffic transmitted over the network 106 during the creation of a mail message 114.

In one implementation, the mail client 108 stores the mail tips received from the web service 116 in a mail tip cache 126. According to one implementation, the configuration mail tips 120 are stored in a registry of the client computer 102. In this embodiment, the recipient mail tips 122 are stored in a random access memory of the client computer 102. It should be appreciated, however, that the mail tip cache 126 may be stored in other manners in other embodiments, such as on a mass storage device of the client computer 102. Other mechanisms for persisting the mail tips retrieved from the web service 116 may also be utilize by the client computer 102.

As will be described in greater detail below, in one embodiment presented herein the mail client 108 is configured to retrieve the configuration mail tips 120 from the web service 116 at the time the mail client 108 is started. It should be appreciated, however, that the configuration mail tips 120 may be retrieved from the web service 116 at any time prior to the composition of the mail message 114. According to other aspects, the recipient mail tips 122 are retrieved from the web service 116 as each recipient of an e-mail message 114 is identified by a user of the client computer 102. For instance, the recipient mail tips 122 may be retrieved from the web service 116, stored in the mail tip cache 126, and displayed to a user of the client computer 102 at the time the sender provides the name of each e-mail recipient. In embodiments, a directory service 124 may be executed on the server computer 104 for resolving the names of e-mail recipients. In one embodiment, the recipient mail tips 122 are not retrieved from the web service 116 until the e-mail recipient has been resolved, such as through the use of the directory service 124.

When subsequent e-mail messages are created, mail tips that have been stored in the mail tip cache 126 are utilized in lieu of again retrieving the mail tips from the web service 116. For instance, if the recipient mail tips 122 were previously cached for a recipient, and that recipient is identified on a subsequent mail message 114, the recipient mail tips stored in the mail tip cache 126 are utilized rather than obtaining new recipient mail tips 122 from the web service 116.

As will also be described in greater detail below, the mail tips stored in the mail tip cache 126 may be periodically updated. For instance, updated configuration mail tips 120 may be retrieved from the web service 116 after a predefined period of time has elapsed since the configuration mail tips 120 were last retrieved. For instance, in one implementation, the configuration mail tips 120 are cached for no less than twenty-four hours. The configuration mail tips 120 are refreshed at the time the first session is established with the mail server 110 after the twenty-four hour period has passed. If a user is still in the same session since the last time the configuration mail tips 120 were cached when the twenty-four hour period has passed, the configuration mail tips 120 stored in the mail tip cache 126 will be cleared and the web service 116 will be queried for updated configuration mail tips 120. Similarly, in one embodiment, the recipient mail tips 122 are cleared each time the mail client 108 is shut down.

Certain recipient mail tips 122 that are likely to change frequently may also be updated after a predefined period of time elapses. For instance, a mail tip corresponding to a mailbox full condition and a mail tip corresponding to a user being out of office may be refreshed from the web service 116 after a predefined period, such as one hour, has elapsed. Other mail tips may also be refreshed in a similar way. In order to refresh these mail tips on such a schedule, a time stamp may be stored within the mail tip cache 126 for these mail tips. Additional details regarding the retrieval, caching, displaying, and updating of the configuration mail tips 120 and the recipient mail tips 122 will be provided below with respect to FIGS. 2-8.

According to other aspects, portions of the mail tip cache 126 may be utilized when the mail client 108 is offline and unable to establish a connection to the mail server 110 and the web service 116. For instance, the configuration mail tips 120 stored in the mail tip cache 126 may be directly utilized when the mail client 108 is offline. In order to use the recipient mail tips 122 when the mail client 108 is offline, these mail tips may be stored in an offline address book 128. As shown in FIG. 1, the offline address book 128 identifies a number of contacts 130, including their e-mail addresses, and may also include the recipient mail tips 122. When the mail client 108 is returned to an online state, updated mail tips may be retrieved from the web service 116.

Figure 2:
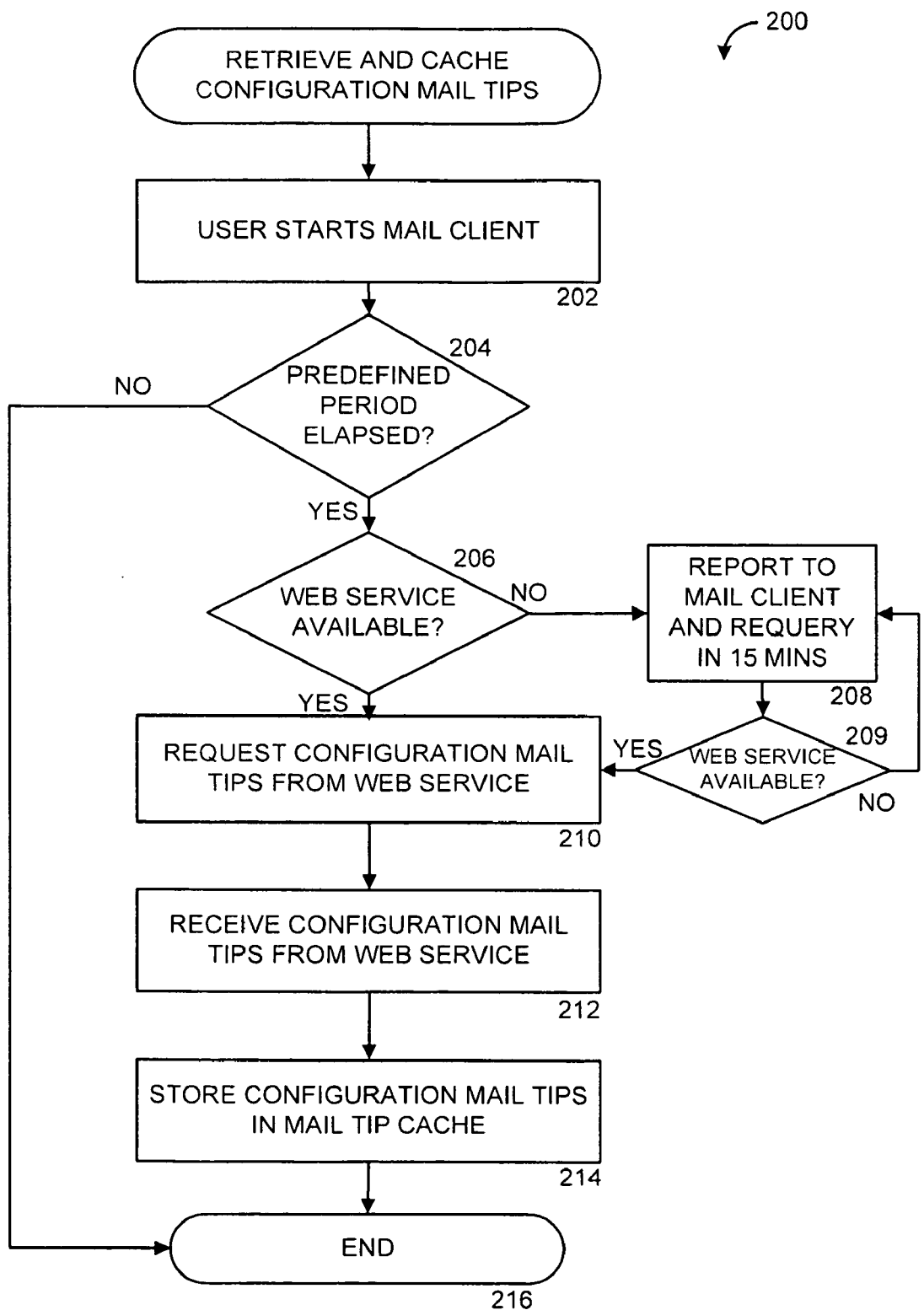
FIGS. 2-5 are flow diagrams illustrating the operation of a mail client for retrieving, caching, exposing, and updating mail tips in various embodiments presented herein.

Referring now to FIG. 2, additional details will be provided regarding the embodiments presented herein for caching and exposing pre-send data relating to the sender or recipient of an e-mail message. In particular, FIG. 2 is a flow diagram illustrating aspects of the operation of the mail client 108 for retrieving and caching the configuration mail tips 120. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 200 begins at operation 202, where a user starts the mail client 108 on client computer 102. Once the mail client 108 has been started, the routine 200 continues to operation 204, where a decision is made as to whether a predefined period has elapsed since the configuration mail tips 120 were last retrieved. As discussed above, this predefined period is set to twenty-four hours in one implementation. It should be appreciated, however, that any predefined period may be set to trigger the refresh of the configuration mail tips 120 stored in the mail tip cache 126. If, at operation 204, the mail client 108 determines that the predetermined time has not elapsed, the routine 200 continues to operation 216, where it ends. If, however, the predefined period has elapsed, the routine 200 continues from operation 204 to operation 206.

At operation 206, a determination is made as to whether the web service 116 is available. If the web service 116 is not currently available, the routine 200 proceeds from operation 206 to operation 208, where the mail client 108 is notified that the web service 116 is unavailable. Additionally, the web service 116 is re-queried after a predetermined period of time has elapsed, such as 15 minutes. After the web service 116 has been re-queried, the routine 200 continues to operation 209 where another determination is made as to whether the web service 116 is available. If the web service 116 is not available, the routine 200 proceeds from operation 209 to operation 208 described above. If the web service 116 is available, the routine 200 proceeds from operation 209 to operation 210. If, at operation 206, the mail client 108 determines that the web service 116 is available, the routine 200 proceeds from operation 206 to operation 210.

At operation 210, the mail client 108 requests the configuration mail tips 120 from the web service 116. The routine 200 then continues to operation 212, where the mail client 108 receives the configuration mail tips 120 from the web service 116. Once the configuration mail tips 120 have been received, the routine 200 continues to operation 214, where the mail client 108 stores the configuration mail tips 120 in the mail tip cache 126. If configuration mail tips 120 were previously stored in the mail tip cache 126, the previously stored configuration mail tips 120 may be cleared prior to storing the updated configuration mail tips 120 or simply overwritten. Once the configuration mail tips 120 have been stored in the mail tips cache 126, the routine 200 continues from operation 214 to operation 216, where it ends.

Figure 3:
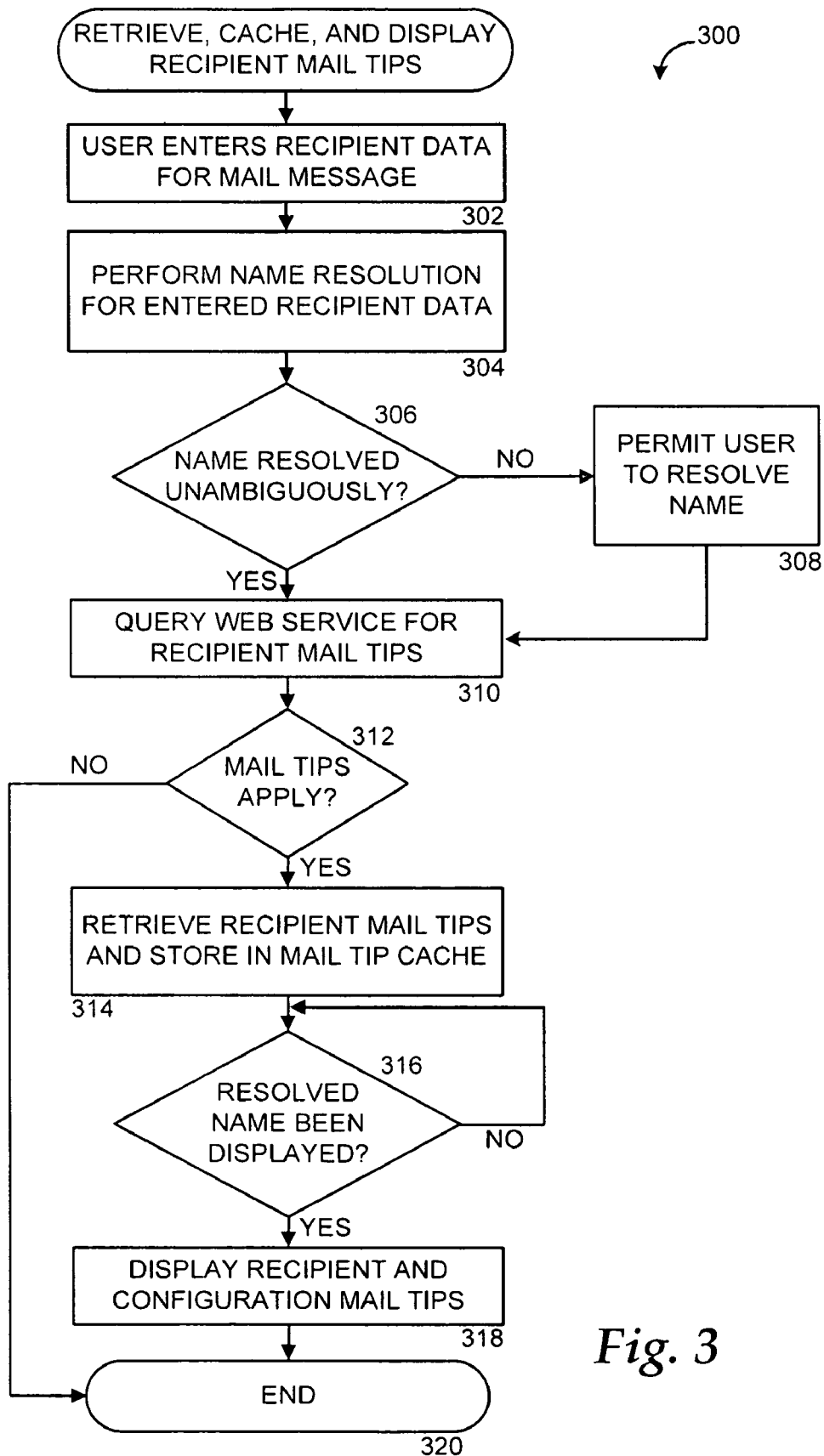

Referring now to FIG. 3, an illustrative routine 300 will be described illustrating operations performed by the mail client 108 for retrieving, caching, and displaying the recipient mail tips 122. The routine 300 begins at operation 302, where a user of the mail client 108 enters recipient data for a new mail message 114. For instance, the user may enter the name of the intended recipient or directly enter an e-mail address for the intended recipient.

Once the user has entered the recipient data, the routine 300 continues to operation 304, where an attempt is made to resolve the entered recipient data into a valid e-mail address. As discussed above, a directory service 124 may be consulted in order to attempt to resolve the e-mail address. According to other embodiments, a nickname cache storing information from mail messages 114 previously sent by the mail client 108 may also be utilized to assist in the resolution of the recipient data. The address book 128 or a global address book stored at the server computer 104 may also be utilized to resolve the recipient's e-mail address. From operation 304, the routine 300 continues to operation 306.

At operation 306, a determination is made as to whether the recipient data was unambiguously resolved into a valid e-mail address. If the recipient data was not unambiguously resolved, the routine 300 proceeds to operation 308, where the user is provided an opportunity to assist in the resolution process. For instance, the user may be permitted to retype the recipient data or to select one of several recipient e-mail addresses. If, at operation 306, it is determined that the recipient data was resolved unambiguously, the routine 300 proceeds from operation 306 to operation 310.

At operation 310, the mail client 108 queries the web service 116 for any recipient mail tips 122 corresponding to the identified recipient's e-mail address. The routine 300 then continues to operation 310, where a determination is made as to whether any mail tips apply to the recipient or the sender of the e-mail message 114. If mail tips do not apply, the routine 300 proceeds to operation 320, where it ends. If any mail tips apply, the routine 300 proceeds from operation 312 to operation 314, where any recipient mail tips 122 available from the web service 116 are retrieved and stored in the mail tip cache 126. The routine 300 then continues to operation 316 where a determination is made as to whether the mail client 108 has displayed the resolved name of the recipient. If the resolved name has not yet been displayed, the routine 300 returns to operation 316. If the resolved name has been displayed, the routine 300 proceeds to operation 318 where the configuration mail tips 120 and the recipient mail tips 122 for the mail message are displayed. By performing the decision operation 316, the mail client 108 ensures that mail tips for a recipient are not displayed until the recipient's resolved name has been displayed. An illustrative user interface for displaying the mail tips will be described below with respect to FIGS. 6-7. From operation 318, the routine 300 continues to operation 320, where it ends.

Figure 4:
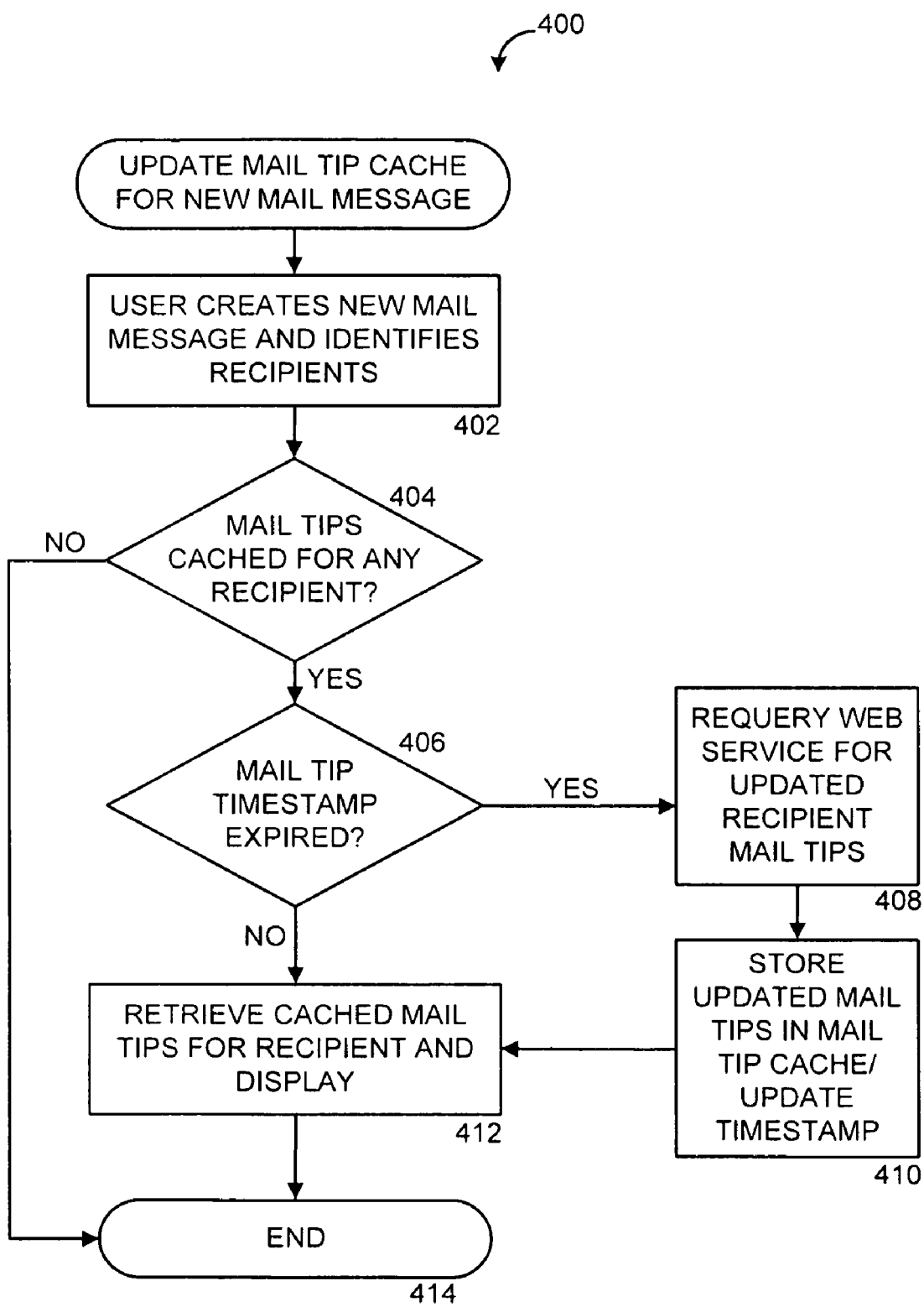

Referring now to FIG. 4, an illustrative routine 400 will be describe illustrating operations performed by the mail client 108 for updating the contents of the mail tip cache 126 when a new mail message 114 is created. As discussed briefly above, the mail client 108 will update certain recipient mail tips 122 stored in the mail tip cache 126 that are likely to change frequently. As also discussed briefly above, in order to accomplish this, the mail client 108 stores a time stamp with each of these mail tips at the time they are stored in the mail tip cache 126. When a new mail message 114 is created, this time stamp is examined to determine whether the recipient mail tips need to be refreshed from the web service 116. The routine 400 illustrated in FIG. 4 shows this process in one embodiment presented herein.

At operation 402, a new mail message 114 is created and the recipients of the mail message are identified. The routine 400 then continues to operation 404 where the mail client 108 determines whether recipient mail tips 122 have been previously cached for any recipient of the new mail message. If not, the routine 400 continues to operation 414, where it ends. In this case, the web service 116 would be queried for any recipient mail tips 122 corresponding to the recipients of the new mail message and these mail tips would be stored in the mail tip cache 126.

If recipient mail tips 122 have been previously stored in the mail tip cache 126 for any of the recipients of the new mail message, the routine 400 continues to operation 406. At operation 406, the mail client 108 determines whether any of the mail tip time stamps have expired for the recipient mail tips 122 stored in the mail tip cache. If so, the routine 400 proceeds to operation 408 where the mail client 108 re-queries the web service 116 for updated recipient mail tips 122. The routine 400 then proceeds to operation 410 where any updated recipient mail tips 122 retrieved from the web service 116 are stored in the mail tip cache 126. The time stamp associated with the recipient mail tips 122 is also updated to reflect the time at which the updated recipient mail tips 122 were retrieved from the web service 116. From operation 410, the routine 400 proceeds to operation 412.

If, at operation 406, the mail client 108 determines that the mail tip time stamp has not expired, the routine 400 proceeds to operation 412. At operation 412, the recipient mail tips 122 stored in the mail tip cache 126 for the recipients of the new mail message 114 are retrieved and displayed. As discussed briefly above, a user interface for displaying the mail tips will be described in greater detail below with respect to FIGS. 6-7. From operation 412, the routine 400 continues to operation 414, where it ends.

Figure 5:
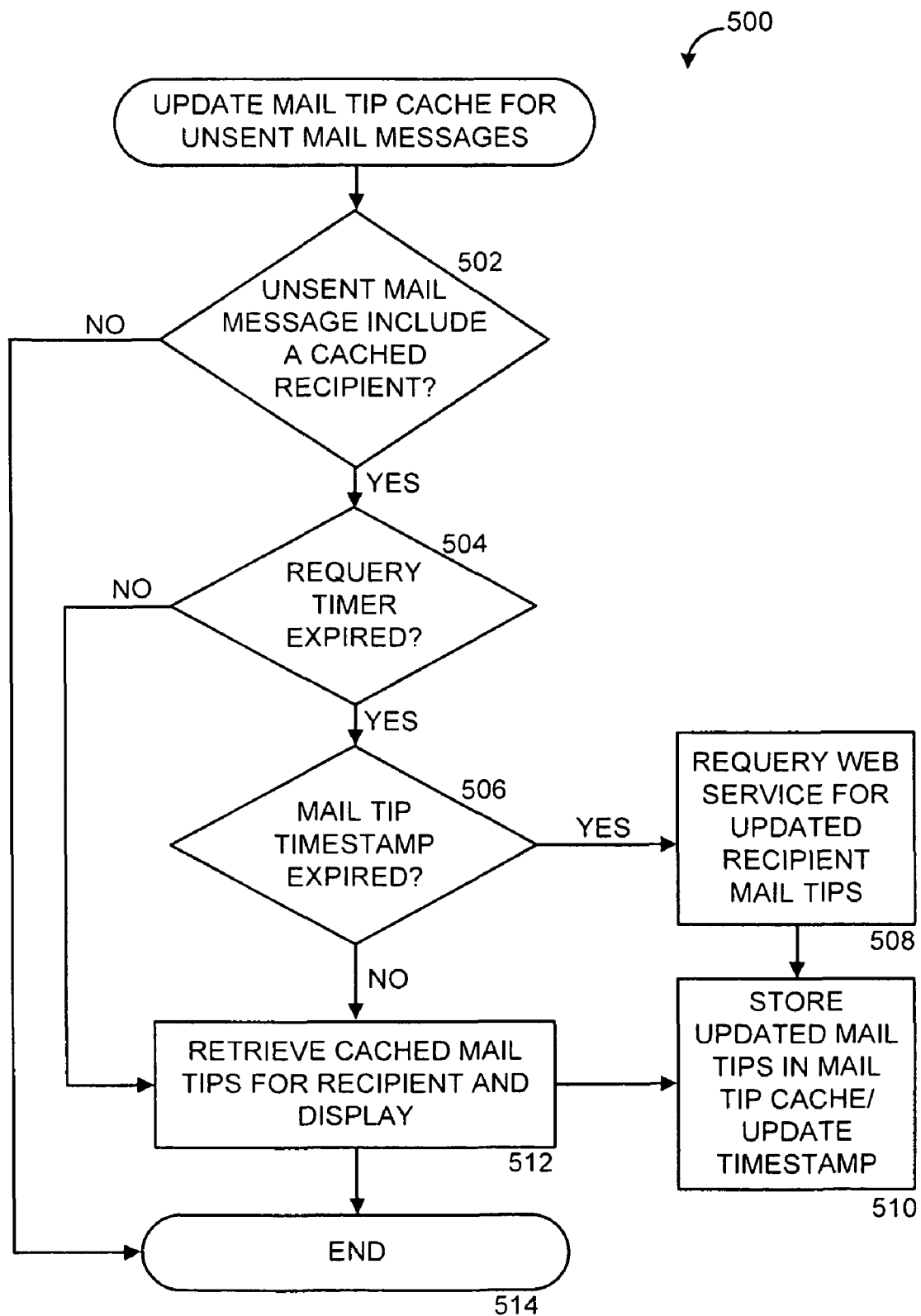

Turning now to FIG. 5, an illustrative routine 500 will be described illustrating a process performed by the mail client 108 for updating the contents of the mail tip cache 126 for a mail message 114 that is created but left unsent. This routine is performed, for example, when a user of the client computer 102 creates a mail message 114 but does not immediately send the mail message 114. For instance, the user may enter recipients for the mail message 114 and leave the focus on the new message 114 but take no other action for a period of time. Alternatively, the user may create a new mail message 114, enter recipients for the new mail message 114, and switch the focus to another application or to the operating system of the client computer 102. When the user returns to the mail message 114, it may be necessary to update the contents of the mail tip cache 126. The routine 500 illustrated in FIG. 5 shows one process performed by the mail client 108 for accomplishing this.

The routine 500 begins at operation 502, where the mail client 108 determines whether focus has been returned to an unsent mail message that includes a recipient for which recipient mail tips 122 were previously stored in the mail tip cache 126. If the unsent mail message does not include recipient mail tips 122 for a recipient, the routine 500 proceeds from operation 502 to operation 514, where it ends. If, however, the unsent mail message includes a recipient for which recipient mail tips 122 were previously cached, the routine 500 continues to operation 504.

At operation 504, the mail client 108 determines whether a re-query timer has expired. In one implementation, the re-query timer is set by the mail client 108 to indicate when a re-query should be made to web service 116 for recipient mail tips 122. In one embodiment, a timed re-query is executed by the mail client 108 after one hour. It should be appreciated, however, that any period of time may be utilized. If the re-query timer has not expired, the routine 500 branches from operation 504 to operation 512, described below. If the re-query timer has expired, the routine 500 continues from operation 504 to operation 506.

At operation 506, the mail client 108 determines whether the mail tip time stamp has expired for the recipient mail tips 122 to be updated. As discussed above, the mail tip time stamp is set for those recipient mail tips 122 that may be frequently modified at the time those recipient mail tips 122 are stored in the mail tip cache. If the mail tip time stamp has not expired, the routine 500 proceeds from operation 506 to operation 512, described below. If, however, the mail tip time stamp has expired, the routine 500 branches from operation 506 to operation 508.

At operation 508, the mail client 108 re-queries the web service 116 for updated recipient mail tips 122. The routine 500 then continues to operation 510, where the updated recipient mail tips 122 are received from the web service 116 and stored in the mail tip cache 126. The time stamp associated with any frequently changed recipient mail tips 122 is also updated. From operation 510, the routine 500 proceeds to operation 512, where the mail client 108 retrieves the cached recipient mail tips 122 from the mail tip cache 126 for the recipients of the unsent mail message 114 and displays them. An illustrative user interface for displaying the mail tips will be discussed below with respect to FIGS. 6-7. From operation 512, the routine 500 proceeds to operation 514, where it ends.

Figure 6:
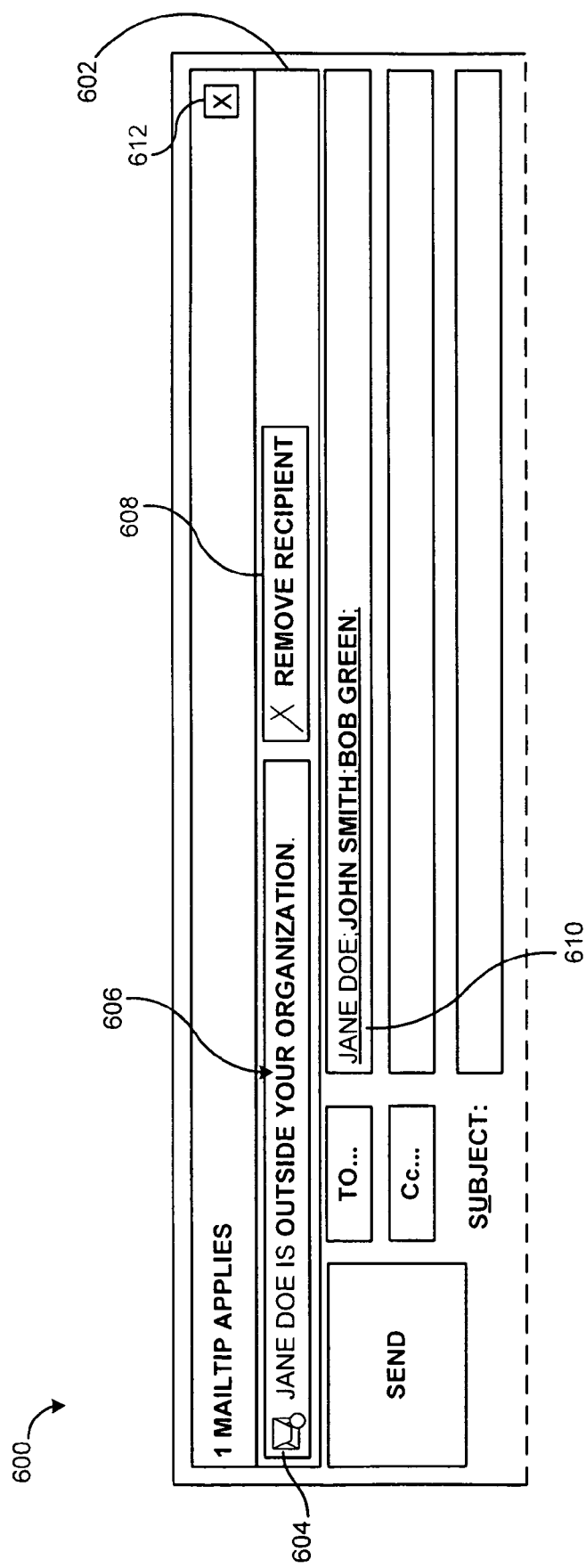
FIGS. 6-8 are screen display diagrams showing various user interfaces for exposing mail tips to an e-mail sender and for configuring the display of mail tips in embodiments presented herein.

Referring now to FIG. 6, an illustrative user interface 600 will be described that is provided by the mail client 108. The user interface 600 shown in FIG. 6 can be utilized in a traditional fashion to specify the recipients of a mail message 114. For instance, as shown in FIG. 6, fields are provided for specifying the recipients of the mail message 114, specifying a subject, and inserting the text of the message. According to implementations, the user interface 600 is also utilized by the mail client 108 to expose the configuration mail tips 120 and recipient mail tips 122 to an e-mail sender.

As shown in FIG. 6, the user interface 600 includes a mail tip bar frame 602. The mail tip bar frame comprises the overall area assigned to the manifestation of mail tips. According to embodiments, the mail tip bar frame 602 may be displayed in different colors depending on the severity of the mail tips being displayed. Moreover, as will be described below with respect to FIG. 7, the mail tip bar frame 602 can be expanded if multiple mail tips are to be displayed or if a single mail tip applies to multiple recipients.

The user interface 600 also includes a mail tip icon 604. The mail tip icon 604 can be varied depending on the severity of the mail tip being displayed. Adjacent to the mail tip icon 604 is the mail tip message 606. The message 606 conveys the effect of the issue reported by the corresponding mail tip. An action button 608 is also provided that allows a user to execute an action to address the issue described by the mail tip message 606. For instance, in the implementation shown in FIG. 6, the action button 608 may be utilized to remove the recipient from the mail message 114. Other actions may also be exposed.

According to embodiments, the recipients of an e-mail address are identified in the user interface 600. For instance, a name 610 may be provided showing the name of one of the intended recipients of the mail message 114. In one embodiment, the recipients of a mail message for which recipient mail tips 122 apply may be highlighted, colored, or otherwise distinguished to indicate that a mail tip is present for that particular user. In this way, the sender's attention may be directed from the recipient name 610 to the mail tip bar frame 602 where the mail tip message 606 has been displayed. A close button 612 may also be provided to hide the mail tip bar frame 602.

Figure 7:
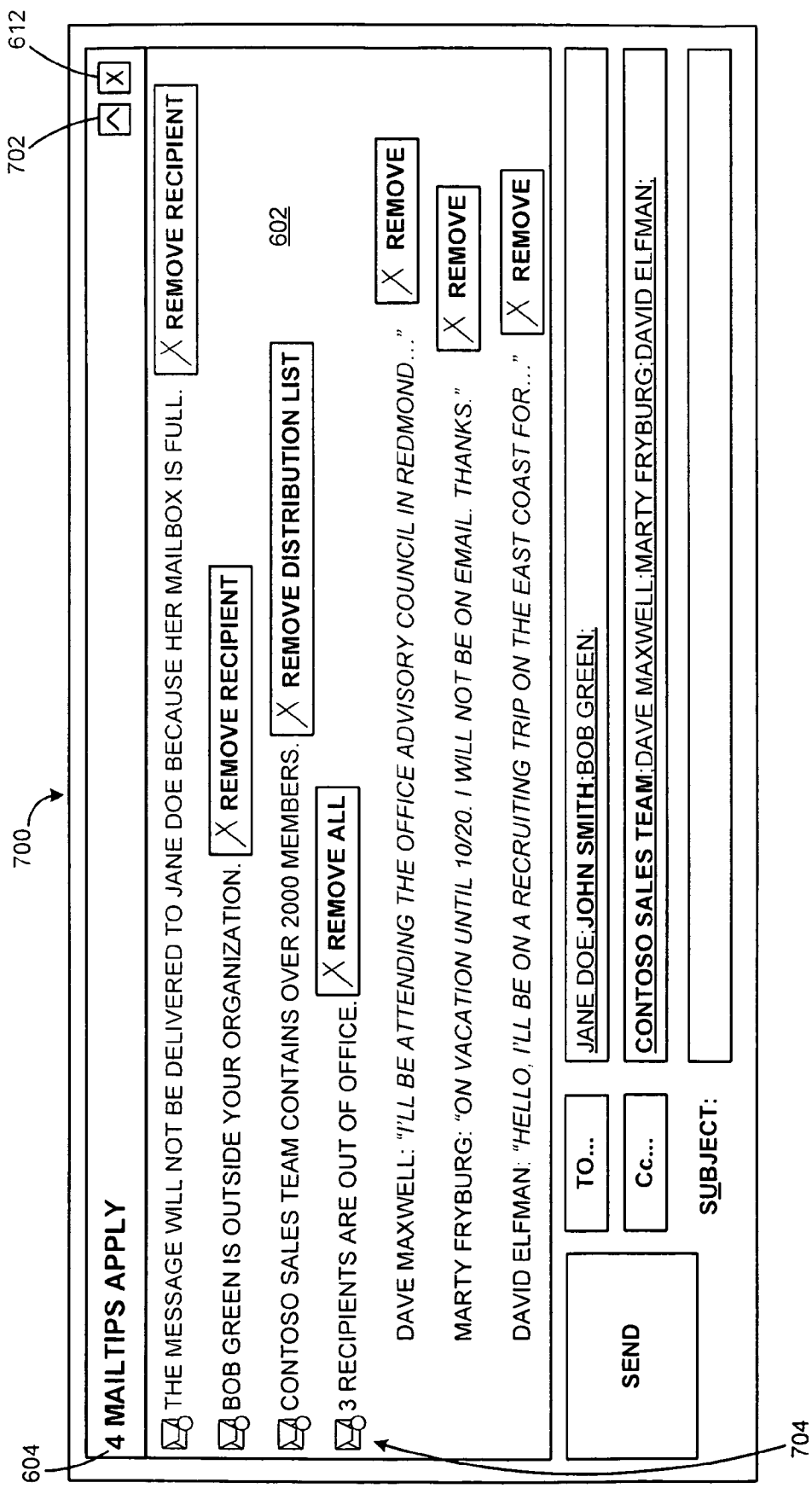

Turning now to FIG. 7, additional details will be provided regarding the user interface described above with reference to FIG. 6 for exposing the configuration mail tips 120 and the recipient mail tips 122. As discussed briefly above, the mail tip bar frame 602 may be expanded if more than two mail tips are to be displayed or if a single mail tip applies to multiple recipients. This is illustrated in FIG. 7. In particular, the mail tip bar frame 602 has been expanded to show mail tip messages for multiple recipients. Additionally, a single mail tip that applies to multiple recipients may be displayed together. For instance, in the example shown in FIG. 7, the mail tip icon 704 is displayed adjacent to a mail tip message corresponding to an out of office mail tip. Adjacent thereto, the out of office message provided by the multiple recipients has been displayed. Action buttons are provided next to each of the mail tip messages so that a user may remove the corresponding recipient from the mail message 114.

Figure 8:
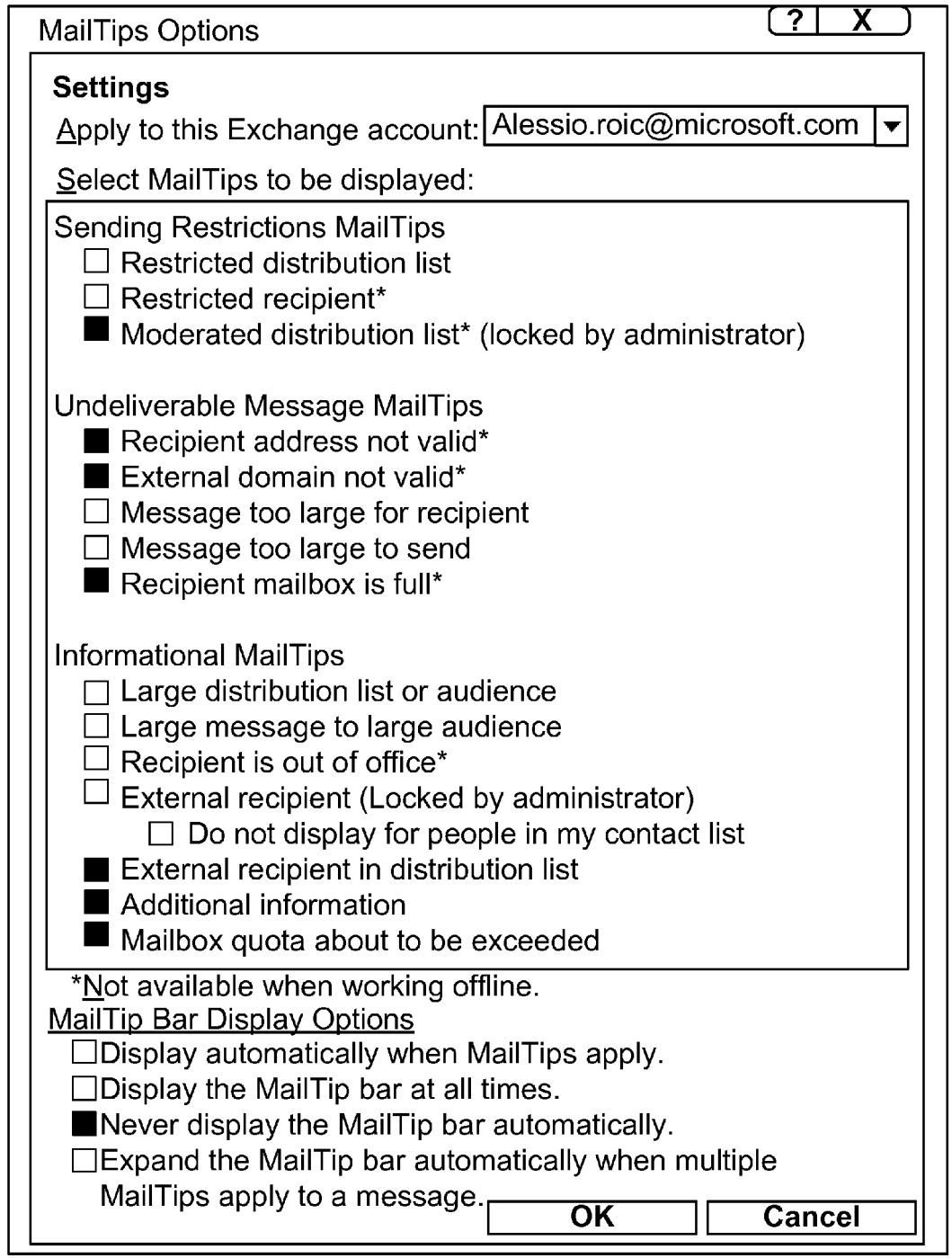

Referring now to FIG. 8, an illustrative user interface 800 will be described that allows a user of the client computer 102 to customize the mail tips that are displayed by the mail client 108. In particular, the user interface 800 provides user interface controls that allow a user of the client computer 102 to specify the mail tips that are to be displayed by the mail client 108. For instance, the user may be able to select whether mail tips are displayed for a restricted distribution list or a restricted recipient. The user may also be able to define whether undeliverable message mail tips may be displayed, such as an invalid recipient address, an invalid external domain, message too large for recipient, message too large to send, and recipient mailbox is full mail tips.

The user interface 800 may also allow the user to define whether informational mail tips are displayed by the mail client 108, such as when a message is sent to a large distribution list or audience, a large message is sent to a large audience, the recipient is out of office, and an external recipient is identified in a distribution list, or when a mailbox quota is about be exceeded. As also illustrated in FIG. 8, an administrator of the mail server 110 may be able to lock the options presented in the user interface 800. In this manner, an administrator of the mail server 110 can force mail tips to be displayed by the mail client 108, or prevent mail tips from being displayed by the mail client 108.

According to other aspects, the user interface 800 includes user interface controls for allowing a user of the mail client 108 to specify that the mail tip bar frame 602 is displayed at all times or that the mail tip bar frame 602 never be displayed. A user interface control may also be provided for allowing a user to specify that the mail tip bar frame 602 be displayed only when a mail tip applies to a message. An option may also be provided to cause the mail client 108 to automatically expand the mail tip bar frame 602 when multiple mail tips apply to a single mail message 114. It should be appreciated the user interface controls and layout shown in FIGS. 6-8 are merely illustrative and that other types of user interface controls, layouts, and formats may be utilized.

Figure 9:
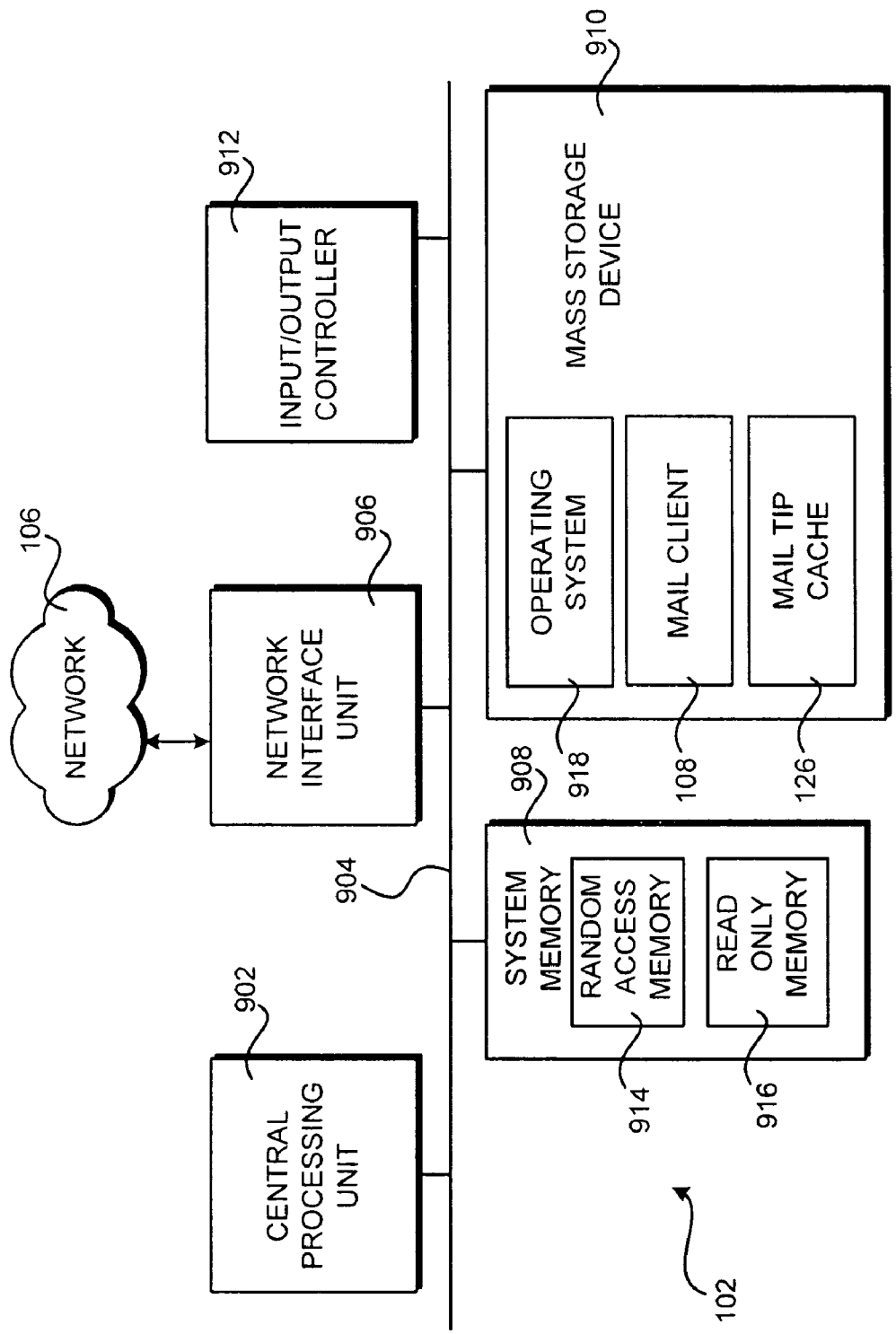
FIG. 9 is a computer architecture diagram showing an illustrative computer hardware and software architecture for a computing system capable of implementing aspects of the embodiments presented herein.

FIG. 9 shows an illustrative computer architecture that may be utilized to embody the client computer 102. In particular, the computer architecture shown in FIG. 9 illustrates a conventional desktop, laptop, or server computer and may be utilized to execute any aspects of the software components presented herein that have been described as executing on the client computer 102. It should be appreciated that the architecture shown in FIG. 9 may also be utilized to embody the server computer 104 and to execute the software components described herein as executing on the server computer 104. Other types of computer architectures may also be utilized to embody the various aspects presented herein.

The computer architecture shown in FIG. 9 includes a central processing unit 902 ("CPU"), a system memory 908, including a random access memory 914 ("RAM") and a read-only memory ("ROM") 916, and a system bus 904 that couples the memory to the CPU 902. A basic input/output system containing the basic routines that help to transfer information between elements within the client computer 102, such as during startup, is stored in the ROM 916. The client computer 102 further includes a mass storage device 910 for storing an operating system 918, application programs, and other program modules, which are described in greater detail herein.

The mass storage device 910 is connected to the CPU 902 through a mass storage controller (not shown) connected to the bus 904. The mass storage device 910 and its associated computer-readable media provide non-volatile storage for the client computer 102. Although the description of computer-readable media contained herein refers to a mass storage device, such as a hard disk or CD-ROM drive, it should be appreciated by those skilled in the art that computer-readable media can be any available computer storage media that can be accessed by the client computer 102.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the client computer 102.

According to various embodiments, the client computer 102 operates in a networked environment using logical connections to remote computers through a network such as the network 106. The client computer 102 may connect to the network 106 through a network interface unit 906 connected to the bus 904. It should be appreciated that the network interface unit 906 may also be utilized to connect to other types of networks and remote computer systems. The client computer 102 may also include an input/output controller 912 for receiving and processing input from a number of other devices, including a keyboard, mouse, or electronic stylus (not shown in FIG. 9). Similarly, an input/output controller may provide output to a display screen, a printer, or other type of output device (also not shown in FIG. 9).

As mentioned briefly above, a number of program modules and data files may be stored in the mass storage device 910 and RAM 914 of the client computer 102, including an operating system 918 suitable for controlling the operation of a networked desktop, laptop, or server computer. The mass storage device 910 and RAM 914 may also store one or more program modules. In particular, the mass storage device 910 and the RAM 914 may store the mail client 108 and the mail tip cache 126, each of which was described in detail above with respect to FIGS. 1-8. The mass storage device 910 and the RAM 914 may also store other types of program modules.

Based on the foregoing, it should be appreciated that technologies for caching and exposing pre-send data relating to the sender or recipient of an e-mail message are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for caching pre-send data relating to the recipient or sender of an electronic mail (e-mail) message, the method comprising:

retrieving one or more recipient mail tips prior to composition of an e-mail message; the recipient mail tips comprising at least one of an indication that a mailbox of the recipient is full or an indication relating to a size of a distribution list to which the e-mail message is addressed;

retrieving, from a web service, one or more configuration mail tips comprising data relating to a sender of the e-mail message;

caching the recipient mail tips and the configuration mail tips with a time stamp indicating a time at which the recipient mail tips and the configuration mail tips are cached;

displaying the recipient mail tips and the configuration mail tips during composition of the e-mail message;

determining whether a predefined period of time has elapsed since the configuration mail tips and the recipient mail tips were retrieved; and in response to determining that the predefined period of time has elapsed, retrieving updated configuration mail tips and updated recipient mail tips from the web service and caching the updated configuration mail tips and the updated recipient mail tips.

2. The method of claim 1, wherein the recipient mail tips comprise an indication that the sender of the e-mail message has insufficient rights to send the e-mail message to a restricted recipient to which the e-mail message is addressed.

3. The method of claim 1, wherein the configuration mail tips comprise an indication that the size of the e-mail message exceeds a send limit associated with an e-mail mailbox of the sender.

4. The method of claim 3, further comprising clearing the recipient mail tips upon receiving a command to close a mail client.

5. The method of claim 1, further comprising retrieving the configuration mail tips in response to the resolution of an e-mail address for the recipient of the e-mail message.

6. A computer storage medium that is not a signal, the computer storage medium having computer executable instructions stored thereon which, when executed by a computer, cause the computer to:

retrieve one or more configuration mail tips from a server computer prior to the composition of an electronic mail (e-mail) message, the configuration mail tips comprising an indication relating to a send limit associated with a sender of the e-mail message;

retrieve from the server computer during the composition of the e-mail message one or more recipient mail tips corresponding to a recipient of the e-mail message;

store the configuration mail tips and the recipient mail tips in a cache with a time stamp indicating a time at which the configuration mail tips and the recipient mail tips are stored in the cache;

retrieve the configuration mail tips and the recipient mail tips in response to the resolution of an e-mail address for the recipient of the e-mail message;

display the configuration mail tips and the recipient mail tips;

determine whether a predefined period of time has elapsed since the configuration mail tips and the recipient mail tips were retrieved; and in response to determining that the predefined period of time has elapsed, retrieve updated configuration mail tips and updated recipient mail tips from the web service and store the updated configuration mail tips and the updated recipient mail tips in the cache.

7. The computer storage medium of claim 6, having further computer executable instructions stored thereon which, when executed by the computer, cause the computer to:

receive the identity of a second recipient during the composition of a subsequent e-mail message;

determine whether any recipient mail tips are stored in the cache corresponding to the second recipient; and to retrieve the recipient mail tips from the cache corresponding to the second recipient and to display the retrieved recipient mail tips in response to determining that mail tips are stored in the cache corresponding to the second recipient.

8. The computer storage medium of claim 6, wherein the recipient mail tips comprise one or more of an indication that the sender of the e-mail message has insufficient rights to send the e-mail message to a restricted recipient to which the e-mail message is addressed.

9. The computer storage medium of claim 8, having further computer executable instructions stored thereon which, when executed by the computer, cause the computer to display an undeliverable message mail tip comprising an indication that a specified e-mail address includes an invalid external domain.

10. The computer storage medium of claim 6, wherein the one or more recipient mail tips and the one or more configuration mail tips are retrieved in response to the resolution of an e-mail address for the recipient of the e-mail message.

11. A method for caching pre-send data relating to the recipient or sender of an electronic mail (e-mail) message, the method comprising:

communicating with a web service to obtain one or more configuration mail tips prior to the composition of an e-mail message, the configuration mail tips comprising data relating to a sender of the e-mail message and comprising an indication that a mailbox of the recipient is full or an indication that the sender of the e-mail message has insufficient rights to send the e-mail message to a restricted recipient to which the e-mail message is addressed;

obtaining from the web service one or more recipient mail tips during the composition of the e-mail message, the recipient mail tips comprising data relating to a recipient of the e-mail message and comprising an indication that sending the e-mail message will exceed a send limit associated with the sender of the e-mail message;

storing the recipient mail tips and the configuration mail tips in a mail tip cache with a time stamp indicating a time at which the recipient mail tips and the configuration mail tips are stored in the mail tip cache;

displaying the recipient mail tips and the configuration mail tips during the composition of the e-mail message;

determining during the composition of a second e-mail message whether any recipient mail tips are stored in the mail tip cache corresponding to a recipient of the second e-mail message;

retrieving any recipient mail tips from the mail tip cache that correspond to a recipient of the second e-mail message;

displaying the recipient mail tips during the composition of the second e-mail message;

determining whether a predefined period of time has elapsed since the configuration mail tips and the recipient mail tips were retrieved; and in response to determining that the predefined period of time has elapsed, retrieving updated configuration mail tips and updated recipient mail tips from the web service and storing the updated configuration mail tips and the updated recipient mail tips in the mail tip cache.

12. The method of claim 11, wherein the one or more recipient mail tips are retrieved from the web service in response to the resolution of an e-mail address for the recipient of the e-mail message.

* * * * *